United States Patent
Tallapaneni et al.

(10) Patent No.: US 8,255,823 B2
(45) Date of Patent: Aug. 28, 2012

(54) FLEXIBLE RENDERING OF USER INTERFACE ELEMENTS

(75) Inventors: Kishore Tallapaneni, Flower Mound, TX (US); Heath Stallings, Grapevine, TX (US); Don Relyea, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1017 days.

(21) Appl. No.: 11/769,866

(22) Filed: Jun. 28, 2007

(65) Prior Publication Data
US 2008/0168383 A1 Jul. 10, 2008

Related U.S. Application Data

(60) Provisional application No. 60/879,003, filed on Jan. 5, 2007.

(51) Int. Cl.
*G06F 3/048* (2006.01)
(52) U.S. Cl. ........ 715/781; 715/800; 715/801; 715/788; 715/764; 345/588; 345/619; 345/660; 345/581
(58) Field of Classification Search .................... 715/781
See application file for complete search history.

(56) References Cited

U.S. PATENT DOCUMENTS

| | | | | |
|---|---|---|---|---|
| 5,577,189 A | * | 11/1996 | Gay et al. | 715/800 |
| 6,177,945 B1 | * | 1/2001 | Pleyer | 345/473 |
| 7,064,772 B1 | * | 6/2006 | Thompson et al. | 345/661 |
| 2002/0191026 A1 | * | 12/2002 | Rodden et al. | 345/779 |
| 2004/0117735 A1 | * | 6/2004 | Breen | 715/517 |
| 2004/0183817 A1 | * | 9/2004 | Kaasila | 345/660 |
| 2006/0023116 A1 | * | 2/2006 | Kunieda et al. | 348/441 |
| 2006/0103660 A1 | * | 5/2006 | Maynard et al. | 345/589 |
| 2006/0176403 A1 | * | 8/2006 | Gritton et al. | 348/581 |

* cited by examiner

*Primary Examiner* — Tadeese Hailu
*Assistant Examiner* — Darrin Hope (57) ABSTRACT

A content processing device is in selective communication with a remote server. A graphical user interface is provided. A rendering application is included within the content processing device. The rendering application is configured to: retrieve a set of presentation elements from the remote server, the set of presentation elements including a graphical element; represent the graphical element as a bitmap; determine each of a location, an orientation, and a size for the graphical element within a graphical user interface; expand the graphical element according to the size; and include the graphical element within the graphical user interface.

19 Claims, 6 Drawing Sheets

FLEXIBLE RENDERING OF USER INTERFACE ELEMENTS

This application claims priority to U.S. provisional patent application Ser. No. 60/879,003, filed Jan. 5, 2007, and entitled "USER INTERFACE FUNCTIONS FOR MEDIA CONTENT ACCESS SYSTEMS AND METHODS," the contents of which are hereby incorporated herein by reference in their entirety.

BACKGROUND INFORMATION

Graphical elements such as images and other items may be rendered in a graphical user interface (GUI) through a content processing device such as a set top box (STB). However, STBs generally include limited amounts of memory, storage, and processing power. Further, graphical elements are generally delivered to a content processing device through network connections that provide limited bandwidth. Requiring an application to repeatedly retrieve large amounts of data is often inefficient, providing poor user response times, among other problems. Because many content processing devices, e.g., STBS, have minimal memory resources, they have difficulty efficiently and in a user-friendly manner supporting applications with numerous resource-consuming graphical elements.

DETAILED DESCRIPTION OF THE PREFERRED EMBODIMENTS

Figure 1:
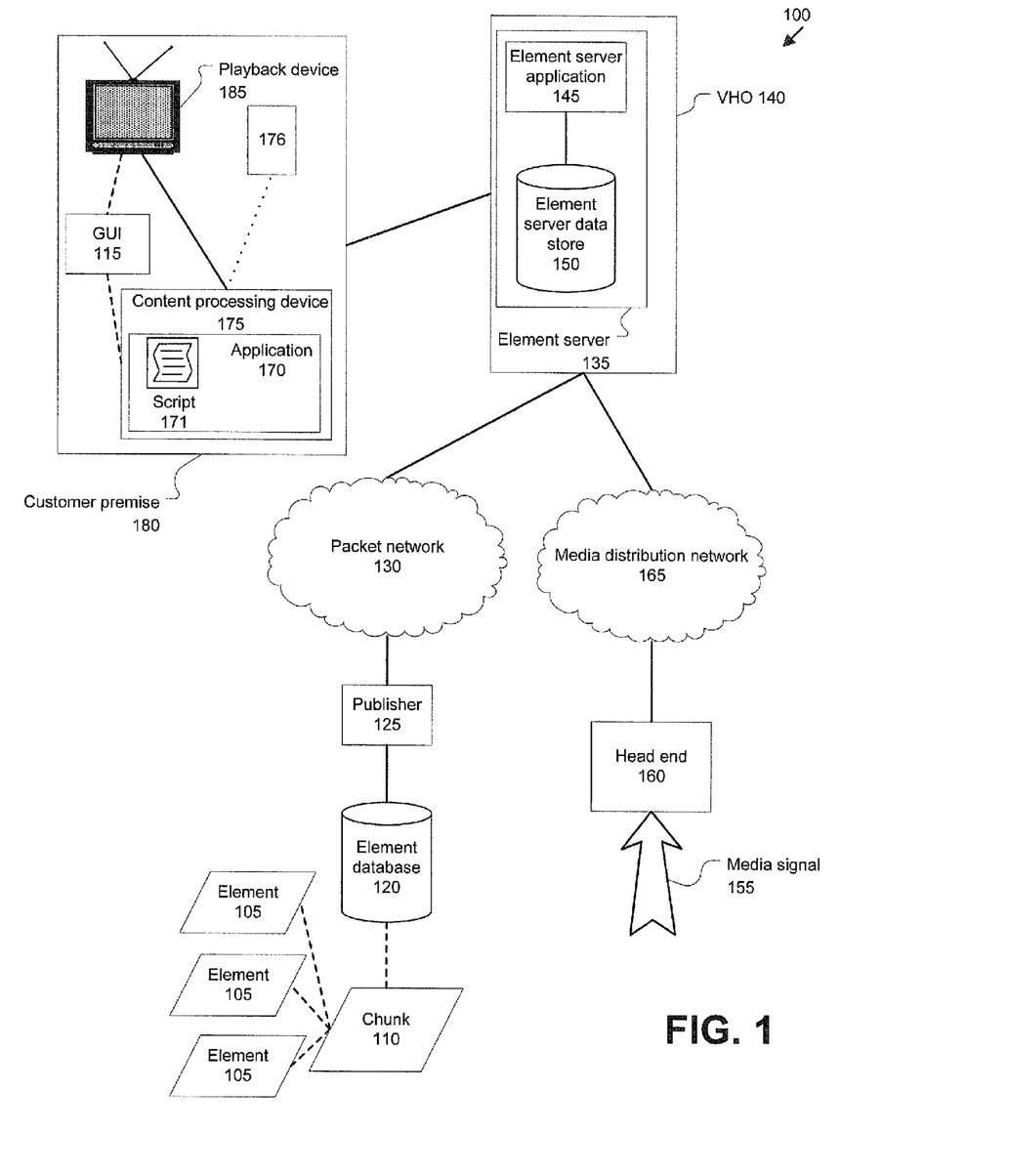
FIG. 1 illustrates an exemplary system for rendering and displaying presentation elements.

FIG. 1 illustrates an exemplary system 100 for rendering and displaying, in a graphical user interface (GUI) 115, presentation elements 105, which may be organized or grouped in chunks 110. Presentation elements 105 may include graphical images, and therefore may include portable network graphics (PNG), graphical interchange format (GIF), joint photographic experts group (JPEG) files, etc.

Elements 105 are generally stored in an element database 120. In an embodiment, element database 120 is a file system associated with a computer running the Microsoft Windows® operating system.

Chunks 110 are logical groupings of elements 105. A chunk 110 generally includes multiple elements 105, although a chunk 110 may include just one element 105. Further, an element 105 may be included in more than one chunk 110. Information concerning chunks 110, i.e., associations of elements 105 with a chunk 110, may be stored in element database 120 or some other data store.

A publisher 125 may be included on a computing device connected to a packet switched network 130. Publisher 125 is used to publish elements 105, generally although not necessarily in chunks 110, through packet-switched network 130 to an element server 135 in video hub office (VHO) 140. Publisher 125 provides chunks 110 to element server 135, generally using known mechanisms for publishing information from a server to a client. For example, publisher 125 may be a web service such as is known using protocols and standards such as simple object access protocol (SOAP), web service description language (WSDL), etc.

Packet switched network 130 is generally an internet protocol (IP) network. As such, network 130 generally uses one or more known protocols for transporting data, such as user datagram protocol (UDP), transport control protocol (TCP), hypertext transfer protocol (HTTP), etc. Further, network 130 may include a variety of networks such as a wide area network (WAN), e.g., the Internet, a local area network (LAN), etc. As is known, packet switched network 130 may be used to transport a variety of data, including multimedia data such as audio data and video data.

Video hub office 140, which includes element server 135 as mentioned above, is known for serving as a point of aggregation for media content. For example, a media signal 155, e.g., a video signal encoded as a Motion Picture Experts Group-2 (MPEG 2) stream, may be provided from a head end 160 through a media distribution network 165 to video hub office 140. Because packet-switched network 130 may be used to transport multimedia data, it is to be understood that embodiments are possible in which networks 125 and 165 are in fact combined into a single network, or in which media distribution network 140 is simply omitted, wherein packet switched network 130 is used to provide media signal 155 to video hub office 140.

Element server 135 is generally a computing device that includes an element server application 165. Further, an element server data store 150 may be included within element server 135, or may be attached to or otherwise in the communication with element server application 165.

Element server application 165 generally includes instructions for receiving chunks 110 from publisher 125, and further for providing chunks 110 to a rendering application 170 within a content processing device 175, e.g., an STB located within a customer premise 180. Upon receiving chunks 110 from publisher 125, element server application 165 generally stores such chunks in element server data store 150. Further, upon receiving a request for a chunk 110 from application 170, element server application 165 generally includes instructions for retrieving such chunk 110 from element server data store 150 and providing the chunk 110 to content processing device 175. While elements 105 are generally organized into chunks 110 for convenience and so that multiple elements 110 can efficiently be combined into a single bitstream transmitted to content processing device 175, it is to be understood that elements 105 may be published, transmitted to application 170, etc. without being organized or logically grouped into chunks 11. Moreover, element server application 165 may on occasion query publisher 125 to obtain chunks 110 and/or elements 105 not found in element server data store 150. Although not specifically shown in FIG. 1, element server 135 and content processing device may communicate through packet-switched network 130 or some other packet-switched, e.g., IP, network.

Rendering application 170 renders GUI 115 for display on media playback device 185. Often, the dimensions of GUI 115 are fixed relative to a screen of media playback device 185, e.g., a television screen. Rendering application 170 accesses a configuration script 171 stored in memory of content processing device 175, generally when content processing device 175 is powered on and boots up. Configuration script 171 includes a uniform resource locator (URL) or other address information for element server 135 including element server application 145 that will provide elements 105 for GUI 115. Upon accessing the URL, application 170 is generally provided with a set of elements 105 to be used in rendering GUI 1S.

Content processing device 175 may be a set top box (STB) or similar device known for receiving a media signal from a network and for providing media programming, e.g., audio, video, etc., to a media playback device 185. Content processing device 175 may be controlled by a user through a control 176, thereby facilitating the selection and playing of content through media playback device 185. But one example, from many possible examples, of content processing device 175 is set top box model DCT6416 made by Motorola, Inc. of Schaumburg, Ill.

Control 176 is generally a remote control known for selectively communicating with content processing device 175 through wireless communications, such as infrared (IR) communications. Control 176 generally includes numeric keys for selecting channels of video programming, as well as other keys for making selections and requests according to menus displayed on playback device 185, in addition to arrow keys and the like for selecting channels and items in a menu, changing volume levels, etc.

Media playback device 185 may include a variety of known equipment alone or in combination, such as a video receiver, including a conventional television or a hi-definition television (HDTV), audio equipment including an amplifier and speakers, or devices that incorporate the capability to simultaneously process both video and audio data, etc. Media playback device 185 may be connected to, and receive multimedia content from, content processing device 175 in a known manner.

Media distribution network 165 may include hardware and software for providing media signal 155 via coaxial cable and/or fiber optic cable. In the illustrated embodiment, fiber optic cable is used to provide both data and media signal 155 to customer premise 180, including to content processing device 175. As is known, an optical line terminal (OLT) may serve as a terminus for an optical network or an optical line. An OLT may accordingly provide data, including video signal 155, to one or more optical network terminals (ONTs). An ONT is generally situated adjacent to a customer premise 180, for the purpose of providing data received over an optical line to the customer premise 180, including content processing device 175. Accordingly, FIG. 1 illustrates a hybrid network system in which media signal 155, transported over media distribution network 165, and also data transported over packet switched network 130, are received in customer premise 180 through a fiber optic line. However, it should be understood that embodiments are possible in which content processing device 175 receives both data and audio/video communications via media other than fiber optic cables to customer premise 180.

Computing devices such as content processing device 175, element server 135, etc. may employ any of a number of computer operating systems known to those skilled in the art, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Computing devices may include any one of a number of known computing devices, including, without limitation, a computer workstation, a desktop, notebook, laptop, or handheld computer, or some other known computing device.

Content processing device 175 generally is a specialized device for receiving video signals 155 from head end 160 via network 165, as discussed above, and may be provided with a proprietary or specialized operating system other than those enumerated above. For example, in one embodiment, content processing device 175 is an STB provided with a real time operating system (RTOS) such as is known. However, it is to be understood that content processing device 175 may be a computing device such as one of those enumerated above, so long as the computing device is capable of receiving media signals 155 from network 165, and also is capable of providing presentation elements 105 for display on the media playback device 185, and sending and receiving communications to and from element server 135, as described herein. Although not reflected in FIG. 1, content processing device 175 and element server 135 may communicate through packet switched network 130. However, content processing device 175 and element server 135 may also conduct packet communications through one or more routers or other switching devices (also not shown in FIG. 1) connected by fiber optic cable, coaxial cable, wires, etc.

Computing devices generally each include instructions executable by one or more computing devices such as those listed above. Computer-executable instructions may be compiled or interpreted from computer programs created using a variety of known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Databases or data stores described herein may include various kinds of mechanisms for storing, accessing, and retrieving various kinds of data, including a hierarchical database, a set of files in a file system, an application database in a proprietary format, a relational database management system (RDBMS), etc. Each such database or data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

Figure 2:
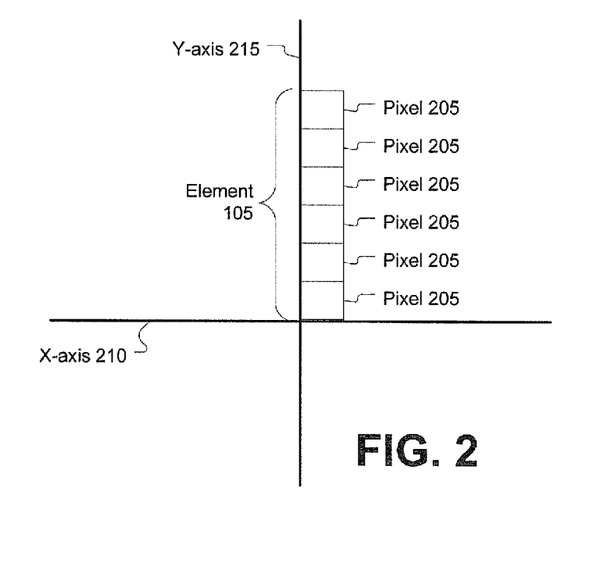
FIG. 2 illustrates an exemplary element that is a bitmap image including six pixels.

FIG. 2 illustrates an exemplary element 105 that is a bitmap image, such as is known, including six pixels 205. As can be seen, the six pixels 205 are stacked vertically one on top of the other. For this reason, the element 105 shown in FIG. 2 may be referred to as a six pixel high by one pixel wide bitmap, or simply as a six pixel bitmap, with reference to x-axis 210 and y-axis 215. As is described further below, a bitmap element 105 that includes a predetermined number of pixels 205 in one dimension, by one pixel 205 in a second dimension, may be provided to content processing device 175 in response to a request from application 170, e.g., a request in configuration script 171. In general, it may be appreciated that a bitmap element 105 that extends only for one pixel 205 in one of the two dimensions of the bitmap element 105 will consume less storage, e.g., an element server data store 150, less bandwidth, e.g., when transmitted from element server 135 to content processing device 175, and less memory, e.g., in content processing device 175.

Figure 3:
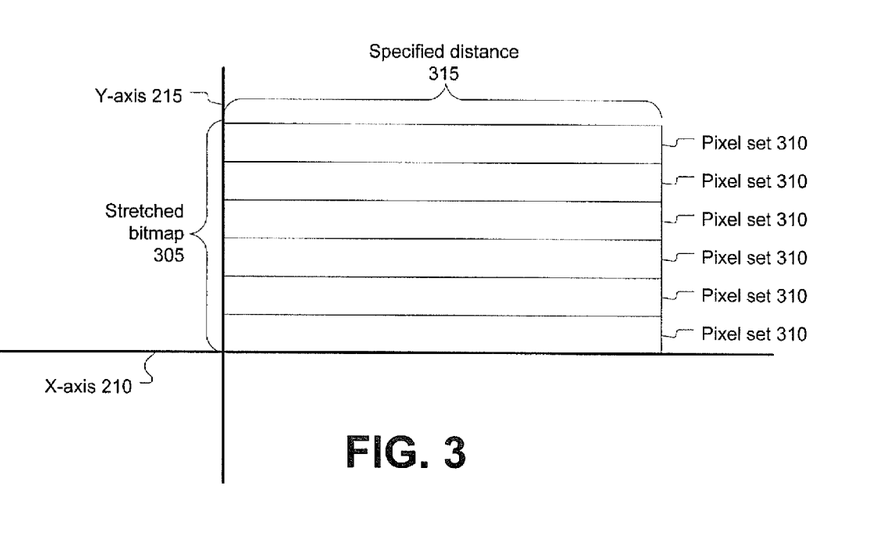
FIG. 3 illustrates a stretched bitmap that includes sets of pixels that have been duplicated along an x-axis to fill a specified distance.

FIG. 3 illustrates a stretched bitmap 305 that includes sets 310 of pixels 205 (such pixels 205 not being separately shown in FIG. 3) that have been duplicated along x-axis 210 to fill a specified distance 315. Accordingly, pixel sets 310 may be thought of as representing a stretched pixel 205, and stretched bitmap 305 may be thought of as representing a stretched bitmap element 105, e.g., a bitmap element 105 being shown in FIG. 2, and also in FIG. 4 discussed below.

As illustrated in FIGS. 2 and 3, a bitmap element 105 that is one pixel across in a given dimension is usually expanded, or stretched, along an axis in that dimension. Bitmap elements 105 that are more than one pixel in a given dimension are generally not expanded, or stretched, along an axis and that dimension. Thus, as seen in FIG. 3, stretched bitmap 305 was expanded, or stretched, along x-axis 210. However, it is to be understood that the present illustration of bitmap element 105 and stretched bitmap 305 with reference to x-axis 210 and y-axis 215 is for convenience, and that a bitmap element 105 could be aligned with an axis at any angle to x-axis 210, and could be stretched or expanded along such axis.

Figure 4:
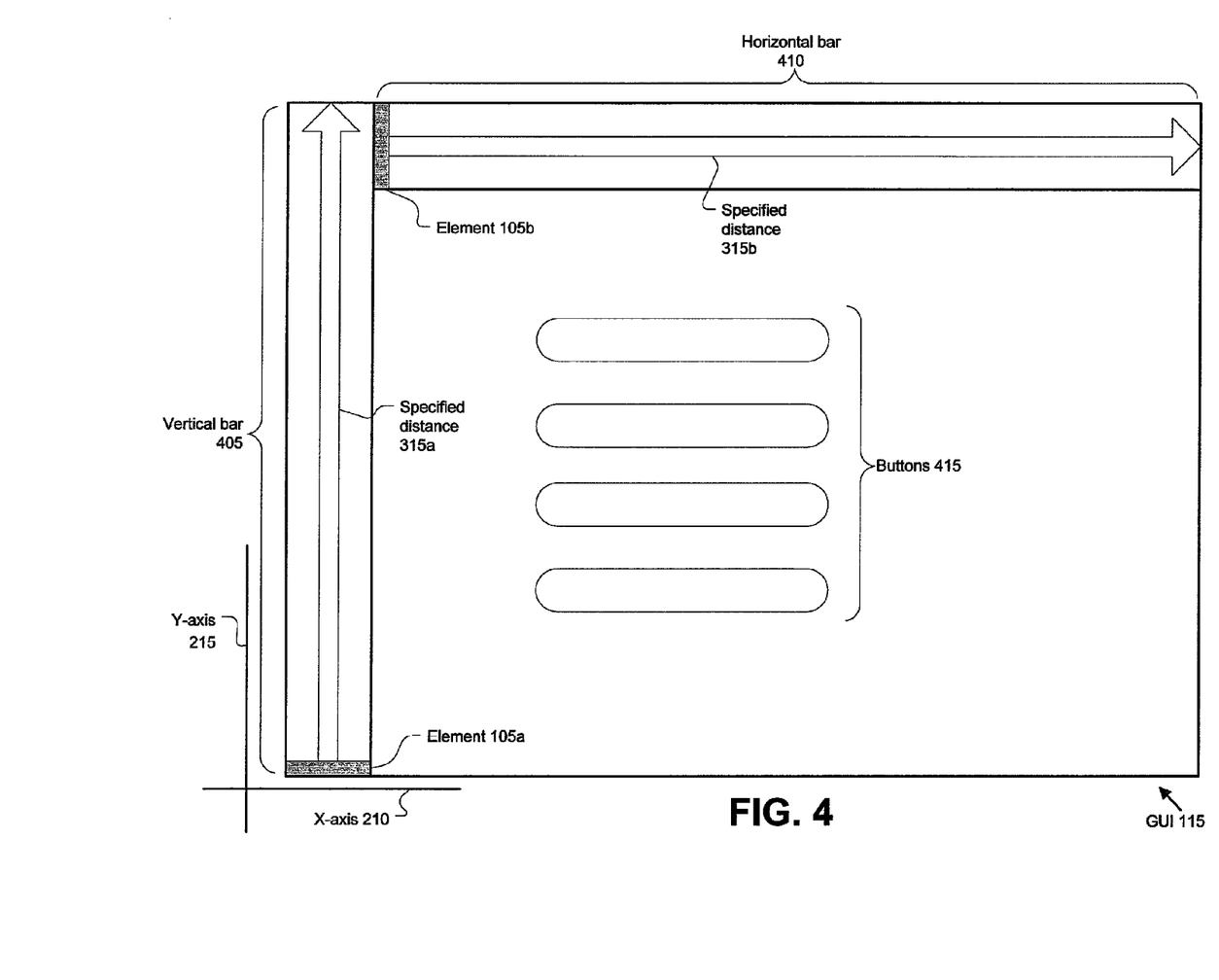
FIG. 4 illustrates placement and rendering of elements in an exemplary graphical user interface.

FIG. 4 illustrates placement and rendering of elements in an exemplary GUI 115. X-axis 210 and y-axis 215 are included in FIG. 4 for purposes of illustrating the orientation of GUI 115, including two elements 105 placed on a GUI 115. As can be seen, GUI 115 is illustrated in FIG. 4 also includes interface components such as a vertical bar 405, a horizontal bar 410, and buttons 415. Element 105a lies parallel to x-axis 210 and is to be stretched a specified distance 315a in a direction parallel to y-axis 215. Element 105b lies parallel to y-axis 215 and is to be stretched a specified distance 315b in a direction parallel to x-axis 210.

Figure 5:
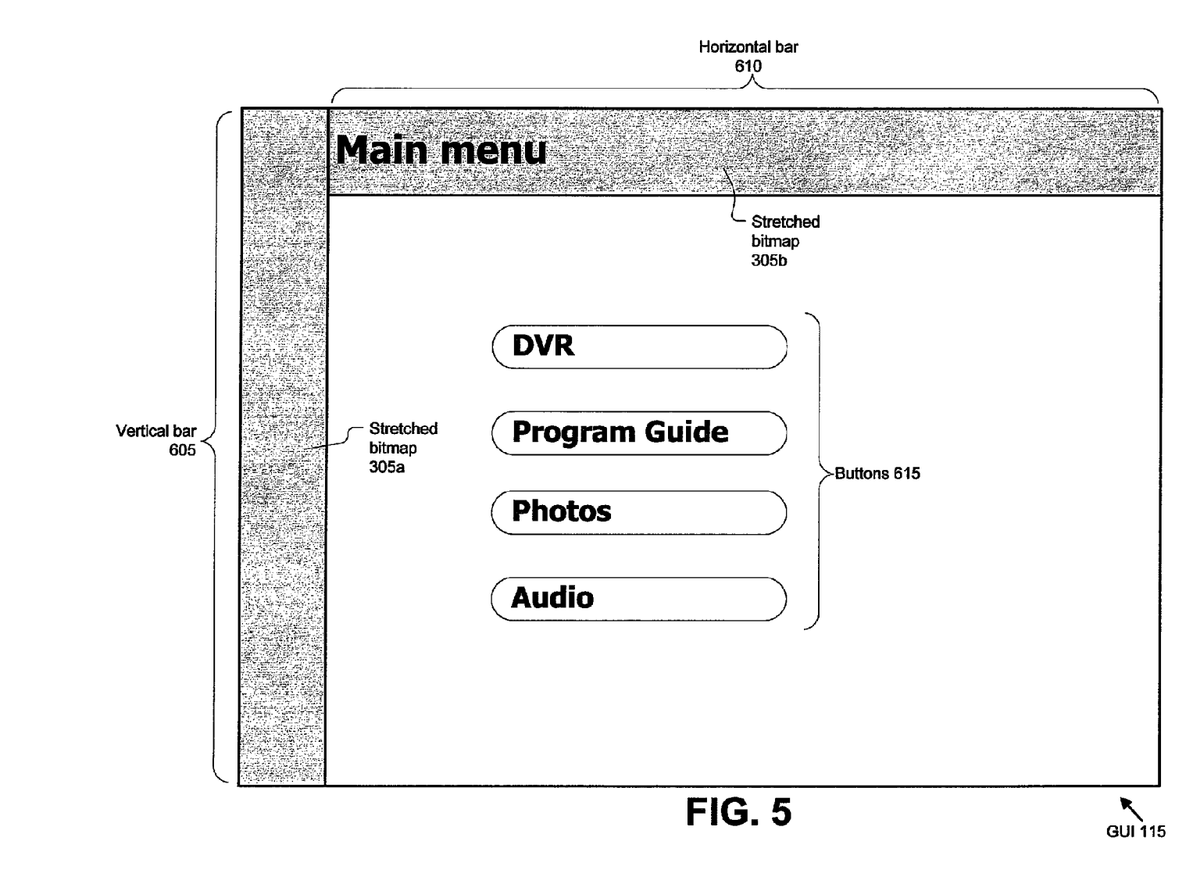
FIG. 5 illustrates an exemplary graphical user interface once elements illustrated in FIG. 4 have been rendered, e.g., stretched.

FIG. 5 illustrates an exemplary GUI 115 once elements 105 illustrated in FIG. 4 have been rendered, e.g., stretched. Accordingly, vertical bar 405 and horizontal bar 410 are shown as completely shaded, i.e., elements 105a and 105b shown in FIG. 4 are not shown in FIG. 5 but have been stretched to cover vertical bar 405 and horizontal bar 410 respectively, thereby creating stretched bitmaps 305a and 305b respectively. That is, stretched bitmaps 305a and 305b respectively share boundaries with vertical bar 405 and horizontal bar 410.

In general, the dimensions or size of GUI 115 is fixed, e.g., relative to a screen of media player 185, e.g., a television screen, a computer screen or the like. Accordingly, as illustrated in FIGS. 4 and 5, bitmap elements 105 are generally stretched or expanded relative to the fixed dimensions or size of GUI 115. Further, while bitmap elements 105 are stretched, other presentation elements displayed in GU 115, e.g., buttons 415, are not. That is, bitmap elements 105 may also be stretched relative to other presentation elements displayed in GUI 115.

Figure 6:
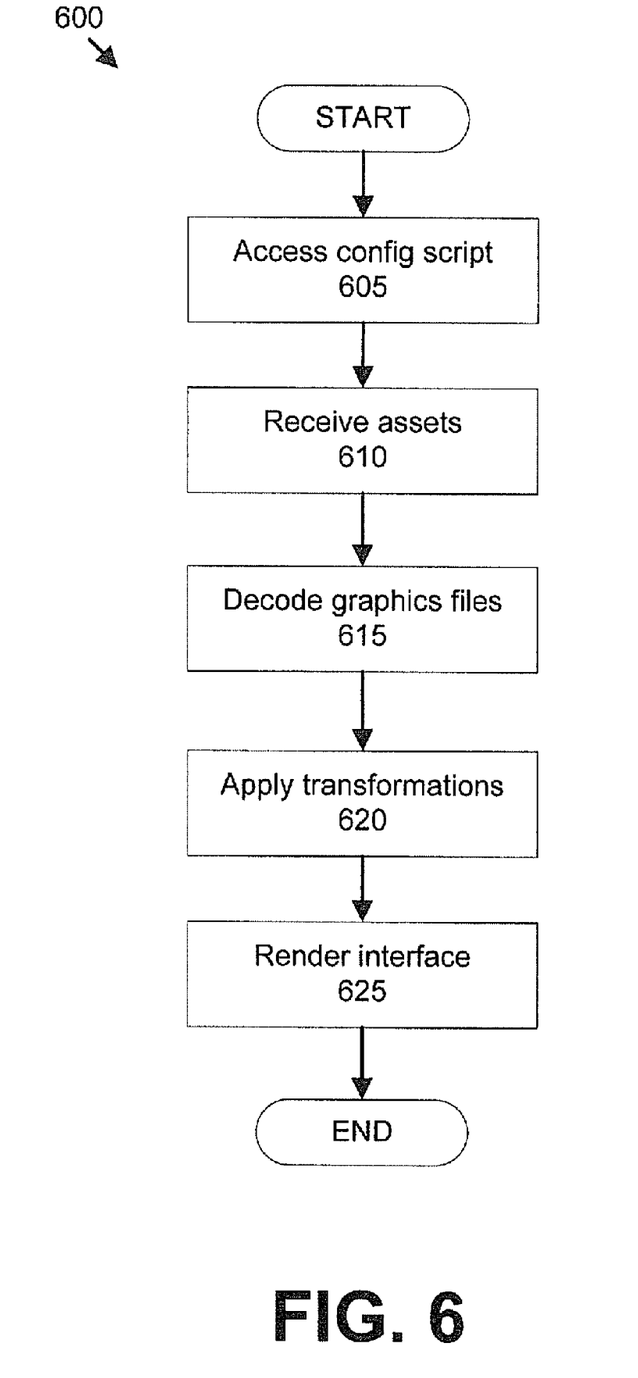
FIG. 6 illustrates an exemplary process for rendering a graphical user interface and displaying a graphical user interface in a media player.

FIG. 6 illustrates an exemplary process 600 for rendering GUI 115 and displaying GU 115 in media player 185.

In step 605, rendering application 170 is instantiated, e.g., upon booting up content processing device 175. Upon being instantiated, application 170 executes configuration script 171. According to instructions included in configuration script 171, application 170 requests presentation elements 105 from element server 135.

Next, in step 610, application 170 receives elements 105 from element server application 145 in element server 135. Elements 105 generally include graphical elements for example, bit streams representing files in portable network graphics (PNG) format. Elements 105 may also include textual information and other data to be included in GUI 115, along with metadata for elements 105. Such metadata may include information concerning coordinates at which elements 105 should be displayed in GUI 115, a specified distance 315 for an element 105 to cover, information concerning elements 105 that are associated with each other, e.g. that should be displayed overlaid at the same coordinates, etc.

Next, in step 615, application 170 decodes graphic files included in elements 105 received in step 610. For example, content processing device 175 may be incapable of rendering and displaying files in PNG format. Accordingly, it may be necessary for elements 105 in PNG format to be decoded to an uncompressed bitmap.

Next, in step 620, according to predetermined program instructions, and possibly using metadata received as described above with respect to step 610, application 170 applies transformations as appropriate to elements 105, such transformations are discussed further below with reference to FIG. 7. Further, an exemplary transformation may be seen by referring to FIGS. 2 and 3, That is, bitmap element 105 shown in FIG. 2 is transformed into stretched bitmap 305 shown in FIG. 3. Such transformations allow for various images included in elements 105 to be efficiently stored and downloaded to content processing device 175, and then rendered in GUI 115.

Next, in step 625, application 170 renders GUI 115, which is then displayed in media playback device 185. GUI 115 is generally rendered according to rules governing the placement and sizing of elements 105, such rules generally included in program instructions of application 170.

Following step 625, process 600 ends.

Figure 7:
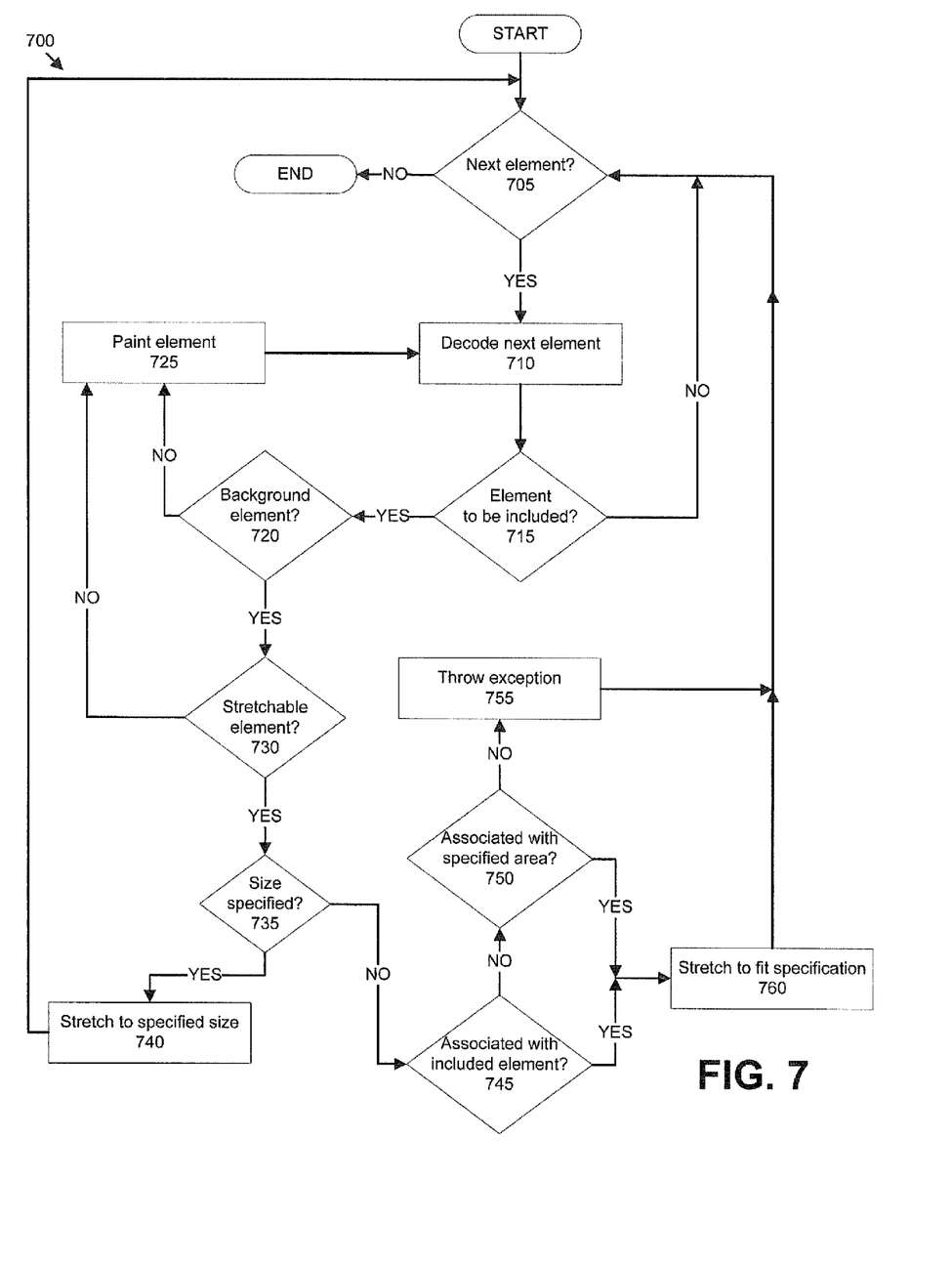
FIG. 7 illustrates an exemplary process for identifying and transforming bitmap elements.

FIG. 7 illustrates an exemplary process 700 for identifying and transforming bitmap elements 105.

In step 705, application 170 determines whether it has any presentation elements 105 to process. That is, process 700 may be initiated in a context such as that described above with respect to process 600 in which content processing device 175 has downloaded one or more elements 105 for rendering in GUI 115. Accordingly, if there are no presentation elements 105 to process, e.g., all downloaded presentation elements 105 have been processed, then process 700 ends. Otherwise, step 710 is executed next.

In step 710, application 170 decodes the current presentation element 105, e.g., as described above with reference to step 615. It should be noted that, if process 700 is executed in the context of a process such as process 600, step 710 may have been performed prior to the initiation of process 700. Further, such a decoding step may be unnecessary if the bitmap element 105 or the like has been downloaded to content processing device 175 in an uncompressed format native to device 175.

Next, in step 715, application 170 determines whether the current presentation element 105 is to be included in GUI 115 as it is presently being rendered. Application 170 may download elements 105 that are appropriate for content processing devices 175 other than the current content processing device 175, or that are appropriate for screens in GUI 115 other than the screen presently being rendered. For example, application 170 may include program instructions to show a "main menu" screen as the first screen displayed upon powering on content processing device 175. However, elements 105 for screens other than the "main menu" screen may be downloaded to content processing device 175, and may be used subsequently.

If the current presentation element 105 is to be included in GUI 115 as it is presently being rendered, then step 720 is executed next. Otherwise, process 700 returns to step 705.

In step 720, application 170 determines whether the current presentation element 105 is a background element 105. Metadata downloaded with presentation elements 105 will generally indicate how a presentation element 105 is to be used. For example, a presentation element 105 may be used as a background element 105 to shade or color areas of GUI 115. If the current presentation element 105 is not a background element 105, then step 725 is executed next. Otherwise, step 730 is executed next.

In step 725, application 170 paints or renders the current presentation element 105 in GUI 115. Metadata included with a presentation element 105 may indicate a placement location for the presentation element 105 in GUI 115, or such metadata may indicate a type or category of presentation element 105, whereby application 170 includes program instructions for a locating or placing the presentation element 105 in GUI 115. A location for placement of the presentation element 105 may be indicated with reference to x-axis 210 and y-axis 215, for example.

In step 730, application 170 determines whether the current presentation element 105 is what may be referred to as a "stretchable" element 105. That is, application 170 determines whether the element 105 is intended to be stretched or expanded for a specified distance 315, as illustrated, e.g., in FIGS. 3 and 4. If the current presentation element 105 is a stretchable element 105, then step 735 is executed next. Otherwise, process 700 proceeds to step 725.

In step 735, application 170 determines whether metadata accompanying the current presentation element 105 indicates a size, e.g., a specified distance 315, for the presentation element 105. That is, application 170 determines whether metadata indicates an amount that the presentation element 105 is to be expanded or stretched. If so, step 740 is executed next. Otherwise, step 745 is executed next.

In step 740, application 170 stretches or expands the current presentation element 105 according to a specified size, e.g., a specified distance 315. Further, application 170 places the resulting stretched bitmap 305 in GUI 115, e.g., according to metadata or program instructions indicating a location for placing the presentation element 105 in GUI 115.

In step 745, application 170 determines whether metadata accompanying the current presentation element 105 or program instructions in application 170, indicate a another element 105 to be rendered in GUI 115, e.g., a foreground element 105, with which the current presentation element 105 is associated. If so, step 760 is executed next. Otherwise, process 700 proceeds to step 750.

In step 750, application 170 determines whether metadata accompanying the current presentation element 105, or program instructions in application 170, indicate a region or area of GUI 115 with which the current presentation element 105 is associated. If so, step 760 is executed next. Otherwise, process 700 proceeds to step 755.

In step 755, application 170 throws and generally logs an exception indicating that a size for a stretched bitmap 305 to be created from the current presentation element 105 could not be determined. Following step 755, process 700 returns to step 705.

In step 760, application 170 stretches or expands the current presentation element 105 to the size indicated by another element 105 as discussed above with respect to step 745 or to the size of a region or area as discussed above with respect to step 750. For example, another element 105 may include text in a specified font having a specified size. Accordingly, application 170 may calculate a specified distance 315 for a stretched bitmap 305 by taking into account the width of the particular characters in the text having the particular font and font size specified.

Similarly, it may be known that a stretched bitmap 305 is to be coterminous with a particular region or area of GUI 115 the size, e.g., specified distance 315, of the particular region or area of GUI 115 being predetermined and therefore known to application 170. For example, GUI 115 may be rendering a program guide in which programs of one half-hour in duration are always described in a space that is a predetermined number of pixels wide, programs of one hour in duration are always described in a space that is a second predetermined number of pixels wide, etc. In this example, application 170 may therefore determine a size, e.g., specified distance 315, for a stretched bitmap 305 based on the fact that the current presentation element 105 is associated with a listing in a program guide, the listing being of a known duration.

Further, specified distances 315 may be dynamically determined. For example, stretched bitmaps 305 may be used to indicate the elapsed time of a program listed in a program guide that is presently being shown. That is, a first stretched bitmap 305 of a first color or shade may be used to indicate an amount of time elapsed. A second stretched bitmap 305 of a second color or shade may be used to indicate an amount of time that a program has yet to run. Accordingly, respective specified distances 315 for these stretched bitmaps 305 may be determined according to a start time for the program compared to a current time stored in a program clock or the like of content processing device 175, and the current time compared to an end time for the program.

Following step 760, process 700 returns to step 705.

Conclusion

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
    retrieving a set of presentation elements from a remote server, the set of presentation elements including a graphical element;
    retrieving metadata from the remote server, the metadata associated with the graphical element and including information specifying coordinates at which the graphical element is to be displayed and a distance for the graphical element to cover within a graphical user interface;
    representing the graphical element as a bitmap;
    using the metadata to determine a distance to stretch the graphical element within the graphical user interface;
    stretching the graphical element the determined distance starting from the specified coordinates; and
    including the stretched graphical element within the graphical user interface.

2. The method of claim 1, wherein representing the graphical element as a bitmap includes decoding a compressed image file.

3. The method of claim 1, wherein the graphical user interface has fixed dimensions.

4. The method of claim 1, wherein respective sizes of some of the presentation elements other than the graphical element are fixed.

5. The method of claim 1, further comprising providing the graphical user interface for display on a media playback device.

6. The method of claim 1, wherein the graphical element is stretched in one of a vertical direction and a horizontal direction.

7. The method of claim 1, tangibly embodied as computer-executable instructions on a non-transitory computer-readable medium.

8. A system, comprising:
    a content processing device in selective communication with a remote server; and
    a rendering application included within the content processing device, the rendering application configured to:
        retrieve a set of presentation elements from the remote server, the set of presentation elements including a graphical element;
        retrieve metadata from the remote server, the metadata associated with the graphical element and including information specifying coordinates at which the graphical element is to be displayed and a distance for the graphical element to cover within a graphical user interface;
        represent the graphical element as a bitmap;
        use the metadata to determine a distance to stretch the graphical element within the graphical user interface;
        stretch the graphical element the determined distance starting from the specified coordinates; and
        include the stretched graphical element within the graphical user interface.

9. The system of claim 8, wherein the rendering application is further configured to represent the graphical element as a bitmap by decoding a compressed image file.

10. The system of claim 8, wherein the graphical user interface has fixed dimensions.

11. The system of claim 8, wherein respective sizes of some of the presentation elements other than the graphical element are fixed.

12. The system of claim 8, further comprising a media playback device that displays the graphical user interface.

13. The system of claim 8, wherein the graphical element is stretched in one of a vertical direction and a horizontal direction.

14. The system of claim 8, wherein the graphical element comprises an image that includes only a plurality of pixels stacked along a first axis.

15. The system of claim 14, wherein the rendering application is configured to stretch the graphical element by stretching the plurality of pixels the determined distance along a second axis perpendicular to the first axis and starting from the specified coordinates.

16. A method, comprising:
    retrieving a set of presentation elements from a remote server, the set of presentation elements including a graphical element and other elements, wherein the graphical element includes only a plurality of pixels stacked along a first axis, and wherein at least some of the other elements have fixed sizes;
    retrieving metadata from the remote server, the metadata associated with the graphical element and including information specifying coordinates at which the graphical element is to be displayed and a distance for the graphical element to cover within an interactive program guide having fixed dimensions;
    representing the graphical element as a bitmap;
    determining each of a location and an orientation for the graphical element on the interactive program guide;
    using the metadata to determine a distance to stretch the graphical element within the interactive program guide;
    stretching the graphical element the determined distance by stretching the plurality of pixels the determined distance along a second axis perpendicular to the first axis and starting from the specified coordinates; and
    including the stretched graphical element within the graphical user interface in accordance with the determined location and orientation for the graphical element.

17. The method of claim 16, wherein the graphical element is stretched in one of a vertical direction and a horizontal direction.

18. The method of claim 1, wherein the graphical element comprises an image that includes only a plurality of pixels stacked along a first axis.

19. The method of claim 18, wherein the stretching of the graphical element comprises stretching the plurality of pixels the determined distance along a second axis perpendicular to the first axis and starting from the specified coordinates.

* * * * *